(Specimens.)
H. CLAUS.
ENAMELING METAL WARE.
No. 506,390. Patented Oct. 10, 1893.
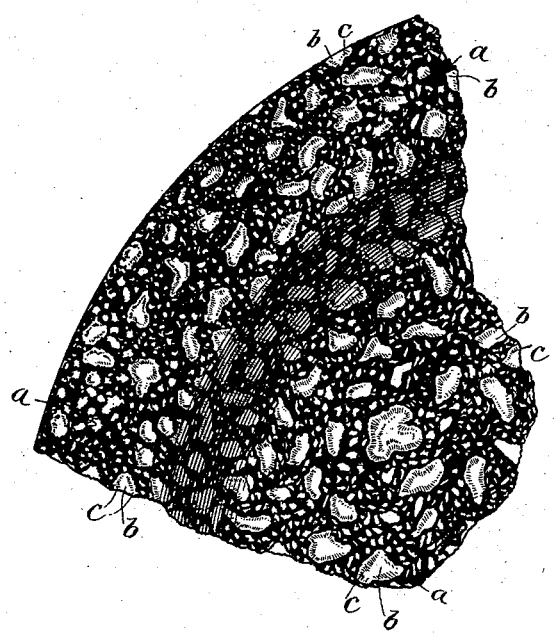
WITNESSES:
INVENTOR
Hubert Claus,
BY
his ATTORNEYS.

UNITED STATES PATENT OFFICE.

HUBERT CLAUS, OF THALE, GERMANY.

ENAMELING METAL WARE.

SPECIFICATION forming part of Letters Patent No. 506,390, dated October 10, 1893.

Application filed April 4, 1893. Serial No. 469,009. (Specimens.)

*To all whom it may concern:*

Be it known that I, HUBERT CLAUS, a resident of Thale-am-Harz, Germany, have invented a certain new and useful Improvement in Enameling Metal Ware, of which the following is a specification.

This invention relates to a new process of enameling metal ware so that with but a single coat of enamel, properly treated as hereinafter specified, a very rich and novel effect may be produced.

The invention consists of the new process hereinafter described and also of the product resulting therefrom.

The drawing represents a face view of an article carrying my improved enamel.

In carrying out my invention I first apply to a metallic article the ordinary ground enamel or ground coat. This ground coat is prepared as heretofore and contains the necessary metallic oxides for giving it the desired color. Hence any color may be supplied. After the enamel for the ground coat has been prepared in the usual way, it is, before application to the vessel, ground particularly fine, and immediately before its application to the vessel a solution of sulphate of ammonia is added. This coat or ground enamel is applied in a pasty condition, the proportion of sulphate of ammonia being such as not to materially add to the fluidity of the coat. The enamel thus prepared is then applied to the vessel. While this first or ground coat is still moist, a second preparation for decorating the ground coat is applied to it. This second enamel is composed of feldspar, quartz, cryolite, soda, oxide of tin and saltpeter, with or without phosphate of lime, in the usual or suitable proportions, and is mixed sufficiently thin to allow it to be easily dismembered into drops when flung from a brush or the like onto the vessel carrying the ground coat. For applying this second enamel I prefer to use mechanism such as described in my application for patent known as Serial No. 463,201, filed February 21, 1893. But any other analogous contrivance may be used with substantially like effect. On flinging the drops of the second mixture upon the still moist first coat or ground coat, the drops crowd the ground coat compactly together, wedging themselves into the ground coat, so to speak, thereby imparting to the entire coat varying degrees of thickness and varying degrees of color. The mechanical action, however, is also supplemented by a chemical process. The alkaline drops of second enamel liberate the ammonium of the sulphate of ammonia contained in the ground, and the ammonia thus liberated serves in turn to liberate out of the silicates gelatinous silicic acid. The molecular motion thus created serves to produce near the peripheries of the drops of the second coat of enamel lines of shade or rings of shading, which conform to the molecular motion produced as described, and which gradually blend the color of the orignal ground enamel into that of the spotting applied thereto. Thus in the drawing the ground enamel is supposed to be black, as at *a;* the spotting applied is supposed to be white, as at *b;* and the rings of coloring matter produced by the molecular motion are observable in the white spots near their margins as at *c*.

Instead of salt of ammonia, analogous salts, such for instance as sulphate of magnesia, would result in analogous effects; but I prefer the sulphate of ammonia.

After the vessel has been treated with the ground enamel and the same spotted as described, the enamel is allowed to dry, and is then burned in a kiln, producing on burning a more or less uniform appearance, resembling a mosaic effect, which of course can be varied, according to the application of the drops, *ad infinitum*.

It is perfectly evident that by coating the vessel with practically a single coat of enamel and using the simple manipulation of flinging the drops upon the moist ground coat, the production of a beautifully enameled vessel is rendered quite economical as contrasted with treatments heretofore deemed necessary in which many coats of enamel were needed.

If desired, a suitable thin coat of enamel may, as is usual, be put on the vessel and burned in, before it is enameled in manner described. But my invention is effective even if such ordinary first coat be omitted.

Having described my invention, I claim—

1. The process herein described of enameling metallic vessels, which process consists in first applying a ground enamel containing sulphate of ammonia, and in thereupon, while said ground enamel is still moist, throwing upon it in spots an alkaline enamel, substantially as described.

2. The process described of enameling metallic articles, which consists in first coating the vessel with a ground enamel containing sulphate of ammonia, and in thereupon applying to the ground coat while still moist an alkaline enamel consisting of feldspar, quartz, cryolite, soda, oxide of tin and saltpeter, substantially as described.

3. As a new article of manufacture, enameled metal ware presenting on a plain ground $a$ the spots $b$ surrounded by the shading $c$, substantially as specified.

HUBERT CLAUS.

Witnesses:
W. EGGELING,
H. WEGENER.